UNITED STATES PATENT OFFICE.

LEONARD F. DUNCAN, OF TROY, OHIO.

BELT-DRESSING.

SPECIFICATION forming part of Letters Patent No. 653,569, dated July 10, 1900.

Application filed March 29, 1900. Serial No. 10,694. (No specimens.)

*To all whom it may concern:*

Be it known that I, LEONARD F. DUNCAN, a citizen of the United States, residing at Troy, in the county of Miami and State of Ohio, have invented a new and useful Composition of Matter to be Used as a Dressing for Belts, of which the following is a specification.

My composition consists of the following ingredients, combined in the manner and in the proportions stated—viz., pure tallow, twenty pounds; pure lard, forty pounds; common salt, ten pounds; sugar, ten pounds; rosin, twenty pounds; water, forty pounds—or in weights of each of like proportion to the combined weight of all the said ingredients.

In preparing the composition the tallow and the lard are to be melted together in a vessel. The salt and sugar are thoroughly dissolved together in the water, preferably heated, and the solution is then added to the melted tallow and lard, at the same time adding the rosin. The whole is then allowed to boil for one and one-half hours. When cooked sufficiently, the water is all boiled out and the composition becomes a froth or foam. It is then allowed to cool and when cool is ready for use. In cooling a sediment amounting to about three per cent. of the entire original ingredients (excepting water) settles to the bottom of the vessel, from which the composition is carefully separated when cooled.

The above-named composition is best applied to a belt while it is running, whereby it is more evenly distributed over the belt.

By the use of the above composition the adhesion of the belt is greatly increased and prevents the belt from slipping under all circumstances, thereby saving power. Furthermore, it makes the belt soft and pliable, renders it waterproof, and increases the life of the belt. Furthermore, it protects the belt when exposed to steam or acids. Furthermore, it removes foreign matter or dirt from the belt. Furthermore, it requires only a small quantity to have the desired effect, thereby rendering its use economical, and, finally, it allows the belt to run slack, thereby preventing the heating of journals, while the machinery will retain the required speed.

I am aware that tallow and rosin have been used in belt-dressing compositions; but I am not aware that all of the ingredients of my composition have been used together.

What I claim, and desire to secure by Letters Patent of the United States, is—

The composition herein described, prepared as herein set forth from tallow, lard, sugar, salt, rosin and water, combined in the proportions stated, for the purpose specified.

In witness whereof I have hereunto set my hand this 26th day of March, A. D. 1900.

LEONARD F. DUNCAN.

Witnesses:
R. H. PARSONS,
W. S. KESSLER.